United States Patent
Kong et al.

(10) Patent No.: US 12,533,858 B2
(45) Date of Patent: Jan. 27, 2026

(54) METHOD FOR CONTROLLING WINDING DEFORMATION OF FIBER FABRIC AND FORMING MOLD THEREOF

(71) Applicant: AECC COMMERCIAL AIRCRAFT ENGINE CO., LTD., Shanghai (CN)

(72) Inventors: Weiyi Kong, Shanghai (CN); Xuan Zhang, Shanghai (CN); Jian Zhang, Shanghai (CN)

(73) Assignee: AECC COMMERCIAL AIRCRAFT ENGINE CO., LTD., Shanghai (CN)

( * ) Notice: Subject to any disclaimer, the term of this patent is extended or adjusted under 35 U.S.C. 154(b) by 48 days.

(21) Appl. No.: 18/007,472

(22) PCT Filed: Apr. 12, 2021

(86) PCT No.: PCT/CN2021/086460
§ 371 (c)(1),
(2) Date: Jan. 30, 2023

(87) PCT Pub. No.: WO2022/021936
PCT Pub. Date: Feb. 3, 2022

(65) Prior Publication Data
US 2023/0271390 A1 Aug. 31, 2023

(30) Foreign Application Priority Data
Jul. 29, 2020 (CN) .......................... 202010745047.6

(51) Int. Cl.
*B29C 70/42* (2006.01)
*B29C 70/22* (2006.01)
(Continued)

(52) U.S. Cl.
CPC ............ *B29C 70/443* (2013.01); *B29C 70/22* (2013.01); *B29C 70/541* (2013.01); *B29K 2105/0845* (2013.01)

(58) Field of Classification Search
CPC .......... B29C 70/541; B29C 2045/1409; B29C 45/14073; B29C 2045/366; B29C 2045/14147
See application file for complete search history.

(56) References Cited

U.S. PATENT DOCUMENTS 3,718,415 A * 2/1973 Felice ................. B29C 45/4005
425/351
3,961,011 A * 6/1976 Bramley .................. D04G 1/00
264/254
(Continued)

FOREIGN PATENT DOCUMENTS

| CN | 1982040 A | 6/2007 |
|---|---|---|
| JP | S6463132 A | 3/1989 |
| JP | H9234803 A | 9/1997 |

OTHER PUBLICATIONS

International Search Report issued on Jul. 12, 2021, in corresponding International Application No. PCT/CN2021/086460, 5 pages.
(Continued)

*Primary Examiner* — Matthew J Daniels
(74) *Attorney, Agent, or Firm* — Maier & Maier, PLLC

(57) ABSTRACT

The present disclosure relates to a control method for winding deformation of fiber fabric and a forming mould thereof. The control method comprises step S1: lifting a plurality of positioning pins arranged on a surface of a forming mould according to a design position of a fiber fabric that is wound on the forming mould; step S2: winding the fiber fabric on the forming mould, and making a plurality of intersections of warp tracer yarn and weft tracer yarn, arranged on the fiber fabric, correspondingly cover on the positioning pins; step S3: retracting the lifted positioning pins; step S4: wrapping the fiber fabric with a fixing mould, and injecting resin after vacuumizing. The present disclosure provides a control method for winding deformation of (Continued)

fiber fabric and a forming mould thereof, ensuring that fiber deformations on the fiber fabric in the winding process meet the design requirements.

6 Claims, 3 Drawing Sheets

(51) Int. Cl.
*B29C 70/44* (2006.01)
*B29C 70/54* (2006.01)
*B29K 105/08* (2006.01)

(56) References Cited

U.S. PATENT DOCUMENTS

| | | | |
|---|---|---|---|
| 5,685,933 A | 11/1997 | Ohta et al. | |
| 2015/0239181 A1* | 8/2015 | Corradini | B65H 23/0328 |
| | | | 156/64 |
| 2018/0056610 A1* | 3/2018 | Osborne | B29C 70/386 |

OTHER PUBLICATIONS

Written Opinion issued on Jul. 21, 2021, in corresponding International Application No. PCT/CN2021/086460, 6 pages.

* cited by examiner

--- Design position

······· Tracer yarn

METHOD FOR CONTROLLING WINDING DEFORMATION OF FIBER FABRIC AND FORMING MOLD THEREOF

TECHNICAL FIELD

The present disclosure relates to the technical field of fiber fabric manufacturing, in particular to a control method for winding deformation of fiber fabric and a forming mould thereof.

BACKGROUND

Fiber reinforced resin matrix composites are one of the most important materials for present aviation structures. With the increasing application proportion of composite materials in aircraft, the size of composite components also increases. The traditional manual paving prepregs adopt laser projection equipment to mark contour lines of the position where the prepreg is to be paved by laser. At present, the paving process of dry fiber fabric is generally to place tracer yarn on the surface of fiber fabric, and align the tracer yarn with the contour line of laser projection to complete the paving of fiber fabric.

By using fiber fabric to make composite components, such as RTM, manufacturing cost can be greatly reduced. Moreover, composite parts with complex structure can be further integrated by three-dimensional reinforced fiber fabric.

When manufacturing composite components with variable curvature and variable diameter with fiber fabric, the fiber fabric is need to be twisted, wound and compacted to meet the forming requirements. During the twist and winding, traditional laser projection and tracer yarn technology is usually used to complete the deformation of fiber fabric. However, this method can only ensure the fabric deformation at the position of the tracer yarn, ensuring the woven structure of the fabric here is consistent with the design after deformation, but cannot accurately 30 control other positions in spite of the tracer yarn position, and cannot ensure all fiber deformation on the composite parts meeting the design requirements. When the tracer yarn does not match the laser projection position, the deviation value can only be obtained through manual measurement, and then the next fiber fabric or the tracer yarn thereof can be adjusted according to the deviation value, which cannot be adjusted in real time on the current fiber fabric.

SUMMARY

For above problems of the prior art, the present disclosure provides a control method for winding deformation of fiber fabric and a forming mould thereof, ensuring that fiber deformations everywhere on the fiber fabric meet the design requirements.

Specifically, the present disclosure provides a control method for winding deformation of fiber fabric, comprising:
  step S1: lifting a plurality of positioning pins arranged on a surface of a forming mould according to a design position of a fiber fabric that is wound on the forming mould;
  step S2: winding the fiber fabric on the forming mould, and making a plurality of intersections of warp tracer yarn and weft tracer yarn, arranged on the fiber fabric, correspondingly cover on the positioning pins;
  step S3: retracting the lifted positioning pins; and
  step S4: wrapping the fiber fabric with a fixing mould, and injecting resin after vacuumizing.

According to one embodiment of the present disclosure, in the design position, the intersections corresponds to positions of the positioning pins.

According to one embodiment of the present disclosure, heights of the positioning pins are adjusted by air pressure to make the positioning pins protrude a set distance from the surface of the forming mould.

According to one embodiment of the present disclosure, the set distance is greater than or equal to zero and less than or equal to 100 mm.

According to one embodiment of the present disclosure, in the step S3, the lifted positioning pins are retracted to make tops of the positioning pins at same height as the surface of the forming mould.

According to one embodiment of the present disclosure, after the step S4, the fiber fabric is heated and pressurized to solidify.

The present disclosure also provides a forming mould, comprising an air pressure control device and a plurality of positioning pins, wherein the positioning pins are arranged on a surface of the forming mould, the air pressure control device is used to lift and lower the positioning pins, the air pressure control device lifts the positioning pins to make the positioning pins protrude a set distance from the surface of the forming mould, and the air pressure control device lowers the positioning pins to make tops of the positioning pins at same height as the surface of the forming mould.

According to one embodiment of the present disclosure, the air pressure control device is connected with the positioning pins through a vacuum conduit.

According to one embodiment of the present disclosure, a moving direction of the positioning pins is perpendicular to the surface of the forming mould.

According to one embodiment of the present disclosure, the set distance is greater than or equal to zero and less than or equal to 100 mm.

A control method for winding deformation of fiber fabric and a forming mould thereof, provided in the present disclosure, arrange positioning pins on the forming mould to make the position of the positioning pins correspond to the intersections of the warp and weft tracer yarns of the fiber fabric, thereby controlling and adjusting the positioning of the intersections to ensure that fiber deformations of the fiber fabric in the winding process meets the design requirements.

It should be understood that the above general description and the following detailed description of the present disclosure are exemplary and illustrative, and are intended to provide further explanation for the present disclosure as claimed in the claims.

BRIEF DESCRIPTION OF THE DRAWINGS

The accompanying drawings are included to provide a further understanding of the present disclosure. They are included and form a part of the present application. The accompanying drawings show embodiments of the present disclosure and play a role in explaining the principles of the present disclosure together with the specification. In the attached drawings.

DETAILED DESCRIPTION OF EMBODIMENTS

Figure 1:
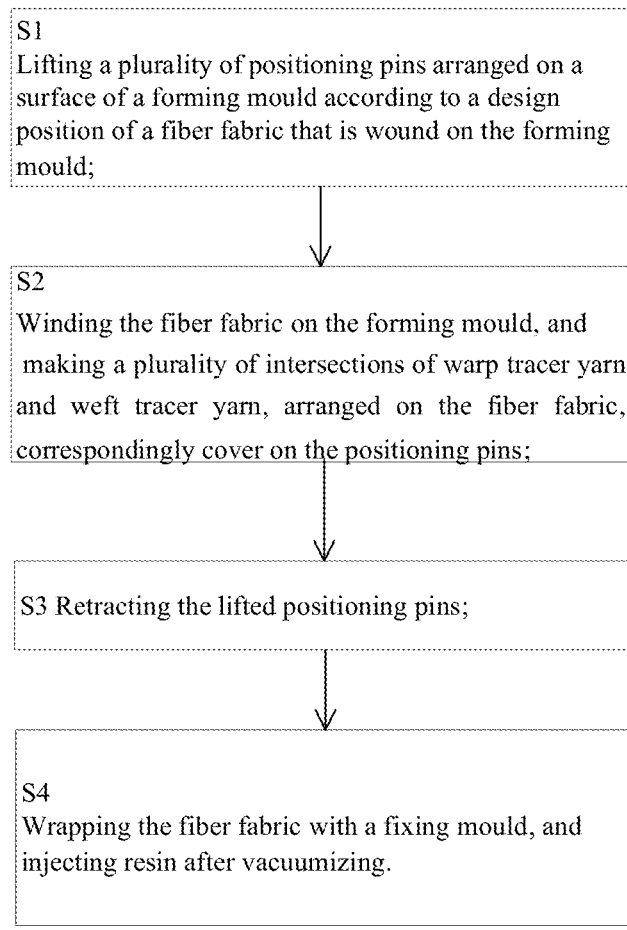
FIG. 1 shows a flowchart of a control method according to one embodiment of the present disclosure.

It should be noted that in conditions without conflict, the embodiments in the present application and the features in the embodiments can be combined with each other.

The technical proposal in embodiments of the present application will be clearly and completely described below in combination with the accompanying drawings in the embodiments of the present application. Obviously, the described embodiments are only part of the embodiments of the present application, but not all of the embodiments. The following description of at least one exemplary embodiment is actually only illustrative and must not serves as any limitation on the present application and its application or use. Based on the embodiments in the present application, all other embodiments, obtained by those skilled in the art without creative work, belong to the scope of protection of the present application.

It should be noted that the terms used herein are only for describing specific embodiments and are not intended to limit the exemplary embodiments according to the present application. As used herein, the singular form is also intended to include the plural form unless the context otherwise expressly indicates. In addition, it should be understood that when the terms "contain" and/or "comprise" are used in this specification, it indicates the presence of features, steps, operations, devices, components and/or combinations thereof.

Unless otherwise specified, the relative arrangement, numerical expressions and numerical values of the components and steps described in these embodiments do not limit the scope of the present application. At the same time, it should be understood that for ease of description, the dimensions of each part shown in the drawings are not drawn according to the actual scale relationship. The technologies, methods and equipment known to ordinary technicians in the relevant field may not be discussed in detail, but in appropriate cases, the technologies, methods and equipment shall be regarded as part of the authorization specification. In all examples shown and discussed herein, any specific value should be interpreted as merely exemplary and not as a limitation. Therefore, other examples of the exemplary embodiment may have different values. It should be noted that similar labels and letters represent similar items in the following drawings. Therefore, once an item is defined in a drawing, it does not need to be further discussed in subsequent drawings.

In the description of the application, it should be understood that the orientation or positional relationship indicated by the orientation and location words such as "front, back, up, down, left, right", "transversal, vertical, perpendicular, horizontal" and "top and bottom" is usually based on the orientation or positional relationship shown in attached drawings, only for the convenience of describing the present application and simplifying the description. Without contrary explanation, these orientation and location words do not indicate and imply that the device or element must have a specific orientation and location or be constructed and operated in a specific orientation and location, so they cannot be understood as limiting the scope of protection of the present application. The orientation and location words "inside and outside" refer to the inside and outside of the contour relative to each component itself.

For ease of description, spatial relative terms, such as "on", "above", "on the upper surface", "upper" and so on, can be used to describe the spatial position relationship between one device or feature and other devices or features as shown in the figure. It should be understood that the spatial relative term is intended to include different orientations and locations in use or operation other than those described in the figure. For example, if the devices in the drawings are inverted, the devices described as "above other devices or structures" or "on other devices or structures" will be positioned as "below other devices or structures" or "under other devices or structures". Thus, the exemplary term "above" may include "above" and "below". The device can also be positioned in other different ways (rotated 90 degrees or in other directions), and the spatial relative description used here is explained accordingly.

In addition, it should be noted that the use of words such as "first" and "second" to define parts and components is only for the convenience of distinguishing corresponding parts and components. Unless otherwise stated, the above words have no special meaning, so they cannot be understood as limiting the scope of protection of the present application. In addition, although the terms used in this application are selected from well-known and common terms, some terms mentioned in the description of this application may be selected by the applicant according to his or her judgment, and their detailed meanings are described in the relevant parts of the description herein. In addition, it is required to understand the application not only through the actual terms used, but also through the meaning contained in each term.

FIG. 1 shows a flowchart of a control method according to one embodiment of the present disclosure. As shown in the figure, a control method for winding deformation of fiber fabric comprises:

Step S1: lifting a plurality of positioning pins arranged on a surface of a forming mould according to a design position of a fiber fabric that is wound on the forming mould. It is easy to understand that the positioning pins can be set on the surface of the forming mould. In an initial state, the top of the positioning pins are at same height as the surface of the forming mould. The positioning pins can be lifted according to the design requirements to make the positioning pins protrude from the surface of the forming mould.

Step S2: winding the fiber fabric on the forming mould, and making a plurality of intersections of warp tracer yarn and weft tracer yarn, arranged on the fiber fabric, correspondingly cover on the positioning pins. The fiber fabric is wound around the axial direction of the forming mould. Warp tracer yarn and weft tracer yarn are woven on the fiber fabric, that is, the tracer yarn technology in the prior art is used to weave the fiber fabric. The warp tracer yarn and the weft tracer yarn intersect to form the intersections. One or more of these intersections need to be deformed in the design position. Therefore, during the winding process, the intersection of these tracer yarns that need to be deformed must be covered on the lifted positioning pins. In this way, the winding of the whole fiber fabric is completed.

Step S3: retracting the lifted positioning pins to make the positioning pins return to the initial position.

Step S4: wrapping the fiber fabric with a fixing mold, and injecting resin after vacuumizing to prepare to solidify the fiber fabric.

Preferably, in the winding design position of the fiber fabric, the intersections of the fiber fabric corresponds to the positions of the positioning pins. The lifting of the positioning pins is to deform the surface of the fiber fabric to meet the design requirements. The action points of the positioning pins are the intersections of the warp tracer yarn and the weft tracer yarn on the fiber fabric. The core of the control method for winding deformation of fiber fabric, provided in the present disclosure, is to deform the surface of fiber fabric through the positioning pins to meet the design requirements.

Preferably, the heights of the positioning pins are adjusted by air pressure control to make the positioning pins protrude a set distance from the surface of the forming mould. It is understandable that the rising and falling of the positioning pins can be both controlled by air pressure to accurately adjust in place.

Preferably, the set distance of the positioning pins is greater than or equal to zero and less than or equal to 100 mm.

Preferably, in the step S3, the lifted positioning pins are retracted to make tops of the positioning pins at same height as the surface of the forming mould. After the winding of the fiber fabric is completed, the lifted positioning pins are recovered to basically return the positioning pins into the forming mould, and reserve an injection space for the fiber fabric.

Preferably, after the step S4, the fiber fabric is heated and pressurized to solidify.

Figure 2:
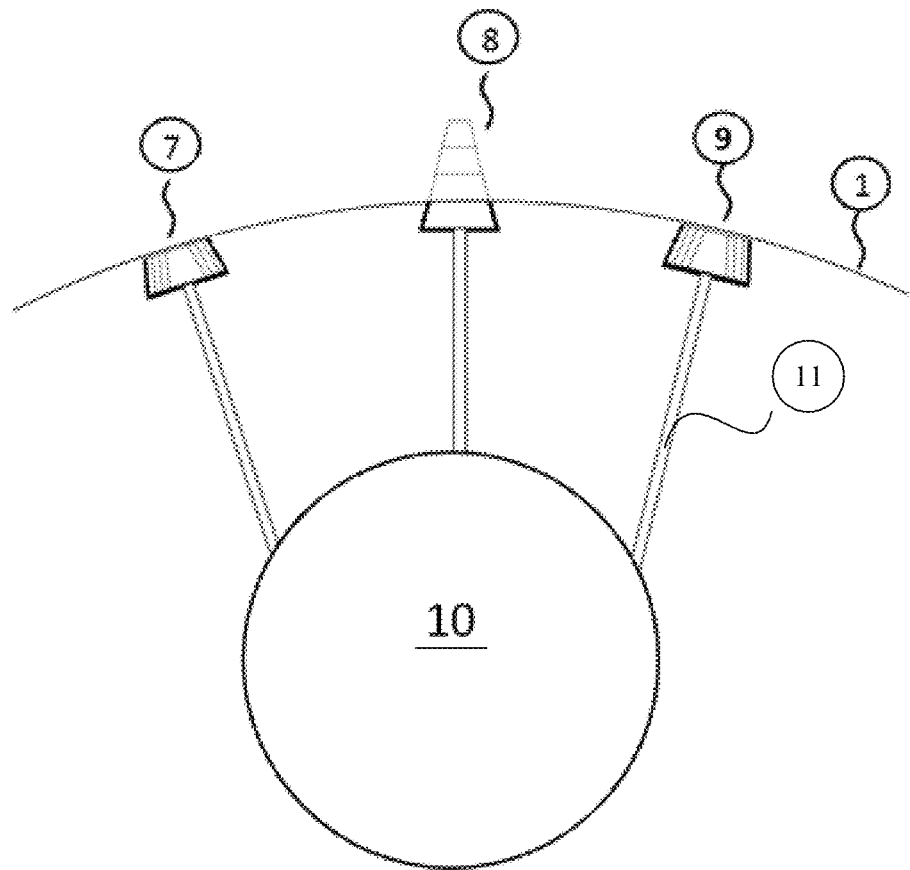
FIG. 2 shows a structural diagram of a forming mould according to one embodiment of the present disclosure.

FIG. 2 shows a structural diagram of a forming mould according to one embodiment of the present disclosure. The present disclosure also provides a forming mould, which is suitable for the control method for winding deformation of fiber fabric. As shown in FIG. 2, the forming mould 1 comprises an air pressure control device 10 and a plurality of positioning pins 7, 8 and 9. The positioning pins 7, 8 and 9 are arranged on the surface of the forming mould 1, which is equivalent to arranging a space for accommodating the positioning pins 7, 8 and 9 on the surface of the forming mould 1. Only three positioning pins 7, 8 and 9 are schematically shown in FIG. 2. The air pressure control device 10 is used to control the lifting and lowering of the positioning pins 7, 8 and 9. The air pressure control device 10 lifts the positioning pins 7, 8 and 9 to make the positioning pins 7, 8 and 9 protrude from the surface of the forming mould 1 by a set distance, and the air pressure control device 10 lowers the positioning pins 7, 8 and 9 to make the tops of the positioning pins 7, 8 and 9 at same height as the surface of the forming mould 1. It is easy to understand that in the initial state, the tops of the positioning pins 7, 8 and 9 is at same height as the surface of the forming mould 1. In other words, in the initial state, there is no projection on the surface of the forming mould 1. Selecting which positioning pin to lift, as well as the specific lifting height, are determined by the air pressure control device 10. In the present embodiment, the air pressure control device 10 is preferably arranged inside the forming mould 1.

Conventionally, the forming mould 1 is a tooling with a fixed shape. The forming mould 1 provided by the present disclosure is provided with positioning pins 7, 8 and 9, which is equivalent to providing a forming mould 1 with a changeable surface shape. The heights of the positioning pins 7, 8 and 9 can be adjusted according to the design needs, so as to change the surface contour of the forming mould 1 and make the deformation of the fiber fabric meet the design requirements.

Preferably, the air pressure control device 10 is connected to the positioning pin 7 through a vacuum conduit 11. Gas is continuously introduced into the vacuum conduit 11 to generate a pressure, thereby pushing up the positioning pins 7, 8 and 9. The vacuum conduit 11 is vaccumized to generate a negative pressure, so that the positioning pins 7, 8 and 9 can be lowered, which is equivalent to absorbing or retracting the positioning pins 7, 8 and 9 to return the positioning pins 7, 8 and 9 to the initial position, so as to maintain the same height as the outer surface of the forming mould 1.

Preferably, the moving directions of the positioning pins 7, 8 and 9 are perpendicular to the surface of the forming mould 1 to ensure that the intersections of the tracer yarns of the fiber fabric meet the deformation requirements.

Preferably, the set distance of the positioning pins 7, 8 and 9 is greater than or equal to zero and less than or equal to 100 mm.

Figure 3:
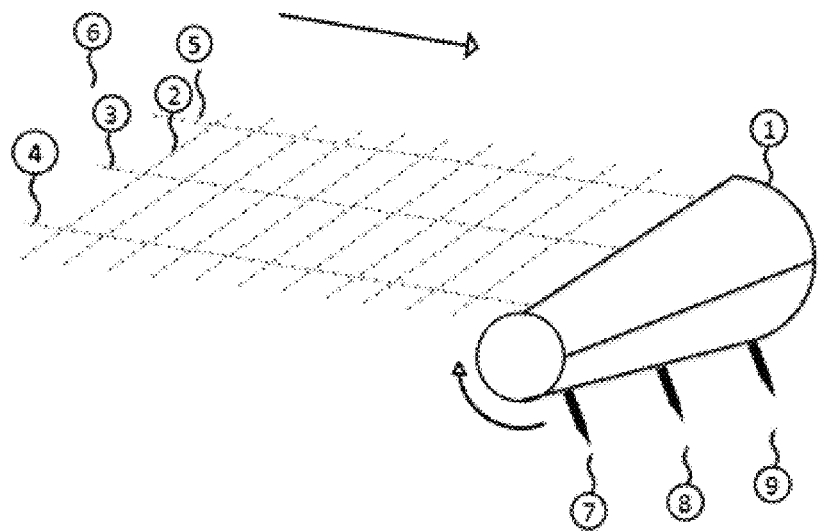
FIG. 3 shows a state diagram of fiber fabric winding according to one embodiment of the present disclosure.
Figure 4:
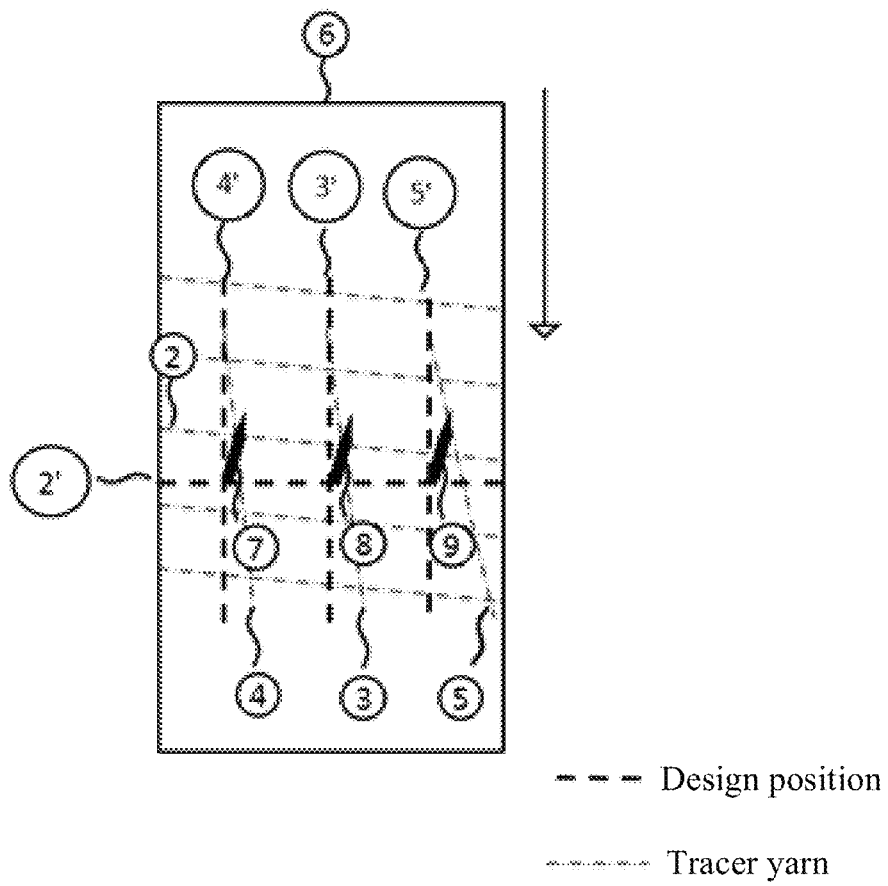
FIG. 4 is a schematic diagram of fiber deformation of the fiber fabric of FIG. 3 during winding.

FIG. 3 shows a state diagram of fiber fabric 6 winding according to one embodiment of the present disclosure. FIG. 4 is a schematic diagram of fiber deformation of the fiber fabric of FIG. 3 during winding. The specific implementation process of a control method for winding deformation of fiber fabric 6 of the present disclosure is described below in combination with FIG. 1 and FIG. 2.

1) As shown in FIG. 3, when the fiber fabric 6 (preform) is in a flat state, warp tracer yarns 3, 4, 5 and weft tracer yarn 2 are inserted at intervals, and the two intersect to form tracer yarn intersections 42, 32, 52;

2) arranging positioning pins 7, 8 and 9 on the outer surface of the forming mould 1 according to the design positions of the tracer yarn intersections 42, 32 and 52 after winding and covering; applying pressures to the positioning pins 7, 8 and 9 through the air pressure control device 10, and transmitting the pressures to the positioning pins 7, 8 and 9 through the vacuum conduit 11, making the heights of the positioning pins 7, 8 and 9 increase with the increase of the pressures. Before applying pressure, the initial height of the positioning pins 7, 8 and 9 is equal to the outer surface of forming mould 1, as the positioning pins 7 and 9 shown in FIG. 2. After applying pressure, the positioning pin 8 is pushed up after being pressed, and the height increases, as shown in FIG. 2. One, more or all positioning pins can be pressed according to the actual design needs, and the specific lifting height of each positioning pin can be selected and adjusted;

It should be noted that the locating pins 7, 8 and 9 can be made of engineering materials with sufficient stiffness such as steel and plastic.

4) Then, the forming mould 1 and the fiber fabric 6 are driven to rotate by a motor, so that the fiber fabric 6 is wound on the forming mould 1. The forming mould 1 is usually a ring workpiece with variable diameter, making the plurality of intersections 42, 32 and 52 of the warp tracer yarns 3, 4 and 5 and the weft tracer yarn 2 arranged on the fiber fabric 6 correspondingly cover on the positioning pins 7, 8 and 9. As shown in FIG. 4, the positioning pins 7, 8 and 9 are lifted to the set height respectively. When the fiber fabric 6 is wound, the intersections 42, 32 and 52 of the warp tracer yarns 3, 4 and 5 and the weft tracer yarn 2 cover the positioning pins 7, 8 and 9 and deform. The positioning pins 7, 8 and 9 penetrate and support their tracer yarn intersections 42, 32 and 52, changing the initial positions of the warp tracer yarns 3, 4, 5 and the weft tracer yarn 2 to the positions of the warp tracer yarns 3', 4', 5' and the weft tracer yarn 2'. That is, it is equivalent to correcting the tracer yarn intersections 42, 32 and 52 to the design position of 4'2', 3'2', and 5'2', so as to meet the requirements of winding design position.

5) Continuing winding the fiber fabric 6 until its end to ensure that all warp tracer yarns 3, 4, 5 and weft tracer yarns 2 are in the design position after deformation, and fixing the end of the fiber fabric 6;
6) vacuumizing with the air pressure control device 10 to generate a negative pressure, sucking back and shrinking the positioning pins 7, 8 and 9 until their tops are flush with the outer surface of the forming mould 1;
7) wrapping the fiber fabric 6 and the forming mould 1 with a solid mould (or flexible mould), and injecting resin after vacuumizing;
8) heating and pressurizing to solidify the fiber fabric 6.

The aim of a control method for winding deformation of fiber fabric and a forming mould thereof, provided in the present disclosure, is to arrange positioning pins on the forming mould by placing warp and weft tracer yarns on the surface of fiber fabric, wherein the positions of the positioning pins correspond to the intersections of tracer yarns. The initial height of the positioning pins is equal to the outer surface of the forming mould. An air pressure control device in the center of the forming mould is used to pressurize, and the air pressure control device is connected to the positioning pins through vacuum conduits. With the increase of pressure, the positioning pins are pressurized and extend out of the surface of the forming mould to reach the set height. The fiber fabric is wound/laid on the forming mould. The positioning pins penetrate and support the intersections of the tracer yarns on the fiber fabric, performing position correction to the warp and weft yarns of the fiber fabric that does not meet the design deformation, as well as accurately controlling and adjusting the winding amount of each tracer yarn intersection in warp and weft directions, so as to ensure that the tracer yarn positions of the fiber fabric remain within a design deviation in the winding/paving process.

It will be apparent to those skilled in the art that various modifications and variations can be made to the above exemplary embodiments of the present disclosure without departing from the spirit and scope of the present disclosure. Therefore, the present disclosure is intended to cover the modifications and variations of the present disclosure that fall within the scope of the appended claims and their equivalent technical proposals.

The invention claimed is:

1. A control method for winding deformation of fiber fabric, comprising:
   step S1: lifting a plurality of positioning pins arranged on a surface of a forming mould according to a design position of a fiber fabric that is wound on the forming mould, said surface of the forming mould having the shape of a truncated cone and being configured to rotate around a central axis, the positioning pins extending perpendicular to the surface of the forming mould;
   step S2: winding the fiber fabric on the forming mould, and making a plurality of intersections of warp tracer yarn and weft tracer yarn, arranged on the fiber fabric, and covering intersections of the plurality of intersections by deforming said intersections, with the lifted plurality of positioning pins, from first intersection positions in an initial position of the fiber fabric to second intersection positions in the design position of the fiber fabric;
   step S3: retracting the lifted plurality of positioning pins; and
   step S4: wrapping the fiber fabric with a fixing mould, and injecting resin after vacuumizing.

2. The control method of claim 1, wherein in the design position, the intersections correspond to positions of the plurality of positioning pins.

3. The control method of claim 1, wherein heights of the plurality of positioning pins are adjusted by air pressure to make the plurality of positioning pins protrude a set distance from the surface of the forming mould.

4. The control method of claim 3, wherein the set distance is greater than or equal to zero and less than or equal to 100 mm.

5. The control method of claim 1, wherein in the step S3, the lifted plurality of positioning pins are retracted to make tops of the plurality of positioning pins at same height as the surface of the forming mould.

6. The control method of claim 1, wherein after the step S4, the fiber fabric is heated and pressurized to solidify.

* * * * *